3,287,540
METHOD AND COMPOSITION FOR JOINING OF ALUMINUM AND DISSIMILAR METALS
Thomas J. Connelly, Buffalo, N.Y., assignor to Allied Chemical Corporation, New York, N.Y., a corporation of New York
No Drawing. Filed May 19, 1964, Ser. No. 368,692
13 Claims. (Cl. 219—118)

This invention relates to joining of aluminum to dissimilar metals, and more particularly to new and improved method and composition for joining aluminum to dissimilar metal to form an assembly in which the joint is equivalent in strength to aluminum metal.

This application is a continuation-in-part of my co-pending application Serial No. 211,098, filed July 19, 1962, now abandoned.

In the fabrication of metals involving aluminum the development of the now well-known tungsten inert gas shielded arc method has made possible the successful joining of aluminum to aluminum in a highly practical manner to form an assembly having strength equivalent to that of aluminum metal. However, the joining of aluminum to a dissimilar metal by fusion techniques has heretofore remained a problem for which there has been no satisfactory and economically attractive solution. Presently known methods for achieving strength in joining of aluminum to dissimilar metals by fusion techniques all require an expensive silver flux and such involved procedures that their application is highly restricted to special situations where economy and simplicity of operations are not controlling factors.

Perhaps the broadest consequence of the inability of the prior art to join aluminum to dissimilar metals has been a limitation in the use of aluminum. In the chemical process industry, for example, it is often desired to join aluminum to dissimilar metals in sheet or tubular form for various purposes, e.g. an aluminum lining to a steel vessel or a copper cooling coil to aluminum processing equipment. In such situations the joint must be strong and permanently sealed under all conditions of use while being capable of withstanding large stresses and pressures and the lack of a practical method of forming such a joint between such dissimilar metal components is obviously a serious disadvantage.

Accordingly, a major object of the present invention is to provide a new and improved method and composition for joining aluminum to a dissimilar metal, and particularly for joining aluminum to dissimilar metals to form an assembly having strength at least equivalent to that of aluminum metal. A further object is to provide a method and composition by which aluminum may also be expeditiously joined to dissimilar metals, such method being in practice broadly applicable to the different types of assemblies which may be fabricated by conventional aluminum welding including, for example, butt welding, lap welding, closed single V joint, single lap joint and closed V joint welding and thus useful in joining tubular members together and to appurtenances in equipment, etc., as well as in the joining of sheet and plate members. Other objects and advantages will be apparent from the following description of the invention.

In accordance with the present invention it has been found that aluminum metal and dissimilar metals may be joined together with the joint between the metals having strength properties equivalent to aluminum by forming a thin metal coating on the dissimilar metal prior to joining with the aluminum. The required metal coating may be readily formed from a special flux composition by melting the composition on the surface of the dissimilar metal and then removing excess flux material, as by vigorous buffing of the cooled surface or rubbing molten material from the uncooled surface, to form a smooth thin deposit or coating. Aluminum metal including fillet material may then be joined to the dissimilar metal by melting of the aluminum and coating under an inert gas shield with a tungsten electrode arc under conditions controlled to permit flow of the molten aluminum to the molten flux coating while avoiding burning off or damage of the coating. The flux composition of the present invention with which particularly excellent results are obtained comprises, in the following proportions by weight:

Stannous chloride, 1⅛ to 2⅜ parts,
Zinc chloride, ⅝ to 1⅜ parts,
Lead in finely divided form, 1½ to 4 parts.

The composition is most conveniently applied to the dissimilar metal surface in the form of a paste which may be readily prepared by the addition of water or other suitable liquid to the composition.

Practice of the present invention in its broader aspects involves: (A) providing a dissimilar metal surface free of oxides and foreign matter; (B) covering said dissimilar metal surface with the indicated flux composition; (C) melting said flux on the surface of the dissimilar metal; (D) forming a thin coating from the molten flux on the surface of the dissimilar metal, preferably by rubbing the molten flux to remove excess material; (E) disposing aluminum metal, preferably free of oxide, adjacent the flux coating on the dissimilar metal surface; (F) applying heat from the electric arc of a tungsten electrode to melt the aluminum metal and flux coating while controlling the electric arc and heat generated thereby to avoid burning off of the flux coating; (G) shielding the aluminum and coating while in the molten state from the atmosphere by an inert gas, preferably argon; and (H) flowing said molten aluminum to the molten coating while continuing said inert gas shielding and arc control to join said aluminum metal to said dissimilar metal.

In carrying out the invention, the aluminum metal which is melted and flowed to the flux coating may be supplied from the aluminum member to be joined or from an aluminum rod adapted to initially deposit a light aluminum pass or bead to which the aluminum member may be later joined by direct aluminum to aluminum welding under conditions of proper control. Generally, the joining of the aluminum metal including the aluminum member, aluminum bead and fillet material may be carried out with the same tungsten electrode, current settings and inert gas flow rate and it will be evident that a particular advantage of the invention is that such joining of aluminum to dissimilar metal may be carried out with the apparatus conventionally employed in the joining of aluminum to aluminum by tungsten inert gas shielded welding. A further advantage of the invention is that it may be adapted to the fabrication of the same wide variety of assemblies possible with that method.

In carrying out the invention it is important that the excess molten flux material on the dissimilar metal surface be removed to form a thin coating which preferably is smooth and has the appearance of a bright or shiny metal. This is preferably accomplished by rubbing the molten flux with a suitable cloth to remove the loose material from the joint area. Vigorous uniform rubbing with mild pressure on the surface is generally desirable to form the thinner coatings. Thickness of the flux coating thus obtained preferably lies within the range of about 0.001 to 0.005 inch and is desirably about 0.002 to 0.004 inch depending on thickness and type of dissimilar metal. The coating thus formed on the surface of the dissimilar metal is relatively stable and may be permitted to stand for indefinite periods before joining of the aluminum metal. Failure to remove the excess flux and form a thin relatively smooth coating results in porosity within the join which substantially weakens the strength of the assembly. The amount of the flux composition or paste initially painted is not particularly important so long as the composition is sufficient to cover the dissimilar metal. The amount applied by painting the flux on the surface with an ordinary paint brush is generally satisfactory. Actual thickness of the flux composition preferably lies in the range of about .004 to .01 inch, and is desirably about .005 to .006 inch in thickness. Heavier amounts may, of course, be applied but are unnecessary and impractical as requiring the removal of larger amount of the molten material to form the flux coating. The area of the dissimilar metal surface covered by the flux composition should be at least equal to and somewhat in excess of that to be covered by aluminum, i.e., the area of the aluminum member to be joined plus that covered by any fillet material. The flux is melted on the dissimilar metal surface and heated to flux fusion temperature. Generally, a temperature of about 400° F. is required to melt the flux with temperatures of about 400° F. to 600° F. being preferably used. Temperatures substantially above about 600° F. are usually avoided to prevent burning off of the flux composition. The dissimilar metal may be heated on the side opposing the joining surface, as with an oxyacetylene flame, before or after application of the flux. Thus, the dissimilar metal surface may be heated to a temperature of about 400° F. to about 600° F., and the flux composition then applied by brushing the composition on the heated metal. Heating is then continued until all the flux is melted. The molten flux on the surface of the dissimilar plate has a dark pasty appearance and is generally permitted to remain on the surface about 10 seconds before removal although the time on the surface of the plate after the flux is melted is not important.

The flux composition useful for joining aluminum to dissimilar metal by the present invention may be varied in make-up from the preferred composition given above and still produce good results. Basically, it has been found that a suitable flux composition is one which contains or supplies tin, zinc and lead, subject to proper proportioning and the provision that at least one metal be supplied in the form of a salt of the metal while at least one other metal is in the form of the base metal. Thus, aluminum may be joined to dissimilar metals by the method of the invention with flux compositions containing, in the following proportions based on the weight of the base metals:

(a) .35 to 1.55 parts tin,
(b) .15 to .75 parts zinc,
(c) 1.25 to 5.5 parts lead, provided at least one metal from the group of (a), (b) and (c), above, is in the form of a salt of the metal while at least one of the other metals is in the form of the base metal. The metal salts employed in the flux composition may be any of the common metal salts which convert to the base metal when the flux composition is subjected to elevated temperatures to form the metal deposit or coating on the dissimilar metal. Examples of suitable salts include the chlorides, bromides, iodides, fluorides, sulfates, sulfites, sulfides, nitrates, nitrites, carbonates, oxalates, and acetates. Also suitable are the oxides of the metals and such oxides shall be included within the definition of "salts" as used herein. The particularly preferred salts are the chlorides and bromides, desirably the chloride. The other halides are less preferred because of increased control required in obtaining a coating on the dissimilar metal, particularly with the fluorides which result in rapid set of the flux deposit on heating such that is becomes more difficult to obtain a satisfactory coating. Usually, the salts other than the halides perform best when the dissimilar metal is iron or contains predominantly iron, e.g. ordinary steel. In the flux composition it is also generally preferred to have either lead or zinc in the form of the salt while the other of these two metals is in the metallic form. Any single metal making up the flux composition may of course be supplied in both the metallic and salt forms. The flux compositions containing two of the components in the form of the base metal, i.e., metallic tin and either lead or zinc in metallic form, are more suitable for joining aluminum to dissimilar metals such as ordinary steel and stainless steel. Compositions containing tin and zinc in metallic form and lead in halide form also provide high strength joining of copper in addition to steel and stainless steel. The flux compositions having the tin and lead supplied in halide form and zinc in metallic form provide the greater high strengths when employed in joining aluminum to copper and ordinary steel and somewhat less strength when joining to stainless steels. The proportions in which the components of the flux are combined may also be varied and produce good results with many dissimilar metals. Thus, compositions containing the lower and higher percentages of zinc and lead are useful in high strength joining of copper and steel to aluminum. Similarly, the lower proportions of tin, particularly in relation to zinc, are suitable with copper and steel and less preferred in the joining of stainless steel to aluminum. For example, the flux compositions containing the lower percentages of tin at a ratio to zinc of less than about 1 to 1 have been found to give good results with certain dissimilar metals and alloys such as copper, brass, everdur, and nickel and fair to good results with others such as Type 308 stainless steel. Increasing the amount of tin and ratio to zinc metal supplied above 1:1 up to about 3:1 results in a particularly excellent composition providing not only superior joint strength with all these metals but also a flux coating which requires less careful control to form and protect during the operation. Further increasing the tin content and ratio to zinc above about 5:1 will still permit high strength joining to steels including stainless steel but becomes less suitable with other metals such as copper. The particularly preferred flux compositions are those supplying 0.7 to 1.5 parts tin, 0.3 to 0.65 part zinc and 1.1 to 3.0 parts lead with either zinc or lead in the halide form, most preferably with the tin and zinc in the from of the halide and the lead in metallic form. The particularly preferred tin halide is the stannous chloride although very good results may also be obtained with stannic chloride and stannous bromide. The preferred halide of lead and zinc is the chloride.

An explanation cannot be given with certainty as the exact mechanism which results in the high strength joining of aluminum to dissimilar metals by the present invention. With regard to the flux composition the omission of any of the three metal components results in failure of the operation. Also, if all three of the metal components are supplied in the form of a salt the flux will not form a satisfactory coating or metal deposit on the dissimilar metal. Similarly, a satisfactory coating is not obtained when the three metal components are supplied in the form of the base metal even though the mixture is prepared to supply the required amounts of each metal as set forth above. However, it has been determined that the coating or metal deposit formed by the flux composition is a mixture of metals or alloy containing a minor amount of zinc metal of the order of less than about 6% by weight as determined by emission spectrograph, usually between about ½ to 3%, with the balance composed of tin and lead each in an amount between about 25–75% by weight, more usually between about 40–60%. Microphotographic analysis of the joint between the aluminum and dissimilar metal shows a thin metal band between the aluminum and dissimilar metal. This band, which is typically only 0.001 to 0.010 millimeter in thickness, contains the tin, zinc and lead with flow of aluminum into the band shown by microphotograph and indicating the formation of a four component alloy band between the aluminum and dissimilar metal. Microphotographic analysis also indicates that metal from the band penetrates the aluminum a short distance averaging typically about 0.005 to 0.05 millimeter. The exact nature of this penetration is not certain but presumably it is the alloy of tin, zinc and lead or alloy of such combination with the aluminum metal. The high melting dissimilar metals such as steel are apparently unaffected at least in that no alloying or substantial penetration by the band metal is indicated by microphotograph.

Preparation of the flux composition involves no special procedure. Desirably, the components are first thoroughly mixed in a siutable apparatus or container. Generally all components of the flux should be of small particle size, the tin and zinc chlorides preferably being in crystalline form. The salts such as tin chloride may be used in hydrate form, e.g., $SnCl_2 \cdot 2H_2O$. The metallic components such as lead should be in finely divided form and are desirably used in the form of a powder having a mesh size within the range of about 100 to 300 standard mesh, preferably about 200 standard mesh. After thorough mixing of the flux components water may then be added and thorough mixing continued until a paste of uniform and desired consistency is formed. The amount of water incorporated in the composition generally represents about 10 to 50 percent of the total weight of the composition, preferably about 25 to 30 percent of the total weight.

The joining of aluminum to dissimilar metal in accordance with the invention may be illustrated by the joining of an aluminum plate to a dissimilar metal plate to form a T-shaped or closed square T assembly in which the dissimilar metal plate forms the horizontal member. The joining surface of the dissimilar metal plate to which the flux is applied is first treated to remove oxides and other foreign matter. This is preferably accomplished by first grinding the dissimilar metal to expose a bright surface and then thoroughly cleaning with a suitable agent, such as dilute hydrochloric acid. The flux composition in aqueous paste form is then painted to a thickness of preferably about .005 inch to .006 inch over an area having a width preferably about 3 times the thickness of the aluminum plate. The surface of the dissimilar metal on the opposite side of the flux is then heated with an oxyacetylene flame until the flux becomes molten. While still in molten form, the excess flux is removed from the surface by rubbing vigorously with a soft wool cloth until a smooth metal deposit or coating is formed. A particularly good deposit or coating characterized by a shiny appearance is formed by the more preferred flux compositions. Thickness or height of the metal deposit or coating thus obtained above the plane of the dissimilar metal is preferably within the range of about .001 inch to .005 inch. The aluminum metal to be joined is then brought into contact with the metal deposit on the surface of the dissimilar metal and held in desired assembled relation manually or with the aid of suitable means such as clamps. The portion of the aluminum member which is to fall in the joint area should also be free of oxide. For this purpose the end and adjacent sides of the aluminum are ground with a wire brush wheel to expose the bright aluminum metal. The end of the aluminum member as joined may be substantially square or may be rounded or tapered during the grinding operation, as desired. It is preferred that the end of the aluminum be slightly tapered or rounded to facilitate penetration and introduction of molten aluminum in the joint, particularly when joining the heavier metal plates. The aluminum member is then tacked or initially joined in assembled relation to the dissimilar metal by the disposition of a small amount of aluminum metal from a consumable rod at intermediate points along the joint. During the tacking the local area of the aluminum plate at which the tacking is to take place is heated to the molten state along with the aluminum rod and flux coating by an arc directed to the aluminum plate from a tungsten electrode. The small amount of molten aluminum required to form the tack is then deposited from the aluminum rod in contact with the molten area of the plate and flux coating and the molten metals allowed to cool to complete the tack. During the tacking the molten metals are shielded from the atmosphere by a blanket of argon gas supplied in the conventional manner from a ceramic cup secured near the end of the tungsten electrode. It is particularly important that the tungsten electrode arc and heat therefrom be carefully controlled during the joining to avoid burning off, penetration or other damage of the flux coating. The electric arc is therefore played or directed mostly to fall on the aluminum plate and to a lesser extent on the flux coating, preferably only as required to maintain the flux coating in the molten state. Usually, the arc is applied to the coating only about 2 to 3 percent of the total heating time between the plate and coating although greater times up to about 5 percent may be tolerated assuming proper control of the heat generated in the joining area. Control of the heat for the particular operation within a reasonable range is primarily a matter of selection of the proper electrode size and current setting which in turn are determined by the thickness of the dissimilar metal. Selection of the proper electrode size and current settings will be readily evident to those skilled in the welding art having as a guide the preferred electrode size and current settings given in Table I, below, for representative thicknesses of the dissimilar metal. As an added precaution it is generally desirable to initially strike the electric arc against a suitable starter plate, such as a copper plate, which is attached to the grounded dissimilar metal plate. The arc is then transferred or carried onto the aluminum plate. In this manner the possibility of the arc puncturing or penetrating the flux coating on initially striking the assembly is avoided.

The assembly initially joined by tacking may then be readily completed by the addition of fillet material to both sides of the T-joint using a consumable aluminum rod and the heat supplied from the arc of the tungsten electrode. The aluminum rod along with the aluminum plate in the joining area are heated and flowed together and onto the flux coating. Again, the disposition of the arc and heat generated thereby are carefully controlled to melt the flux coating without burning off of the same by directing and maintaining the arc mostly on the aluminum plate. Distance of the arc above the coating when applied to the aluminum plate as it passes transversely therealong is preferably in the range of about 1/8 inch to 3/16 inch or about the same as in the tacking operation. The size of the tungsten electrode, current setting, and rate of flow of argon gas directed to shield the molten metal are also conveniently the same as employed in the tacking operation.

In another embodiment of the invention aluminum may be joined to dissimilar metal to form, for example, a T-shaped assembly by initially joining a small amount of aluminum to the flux coating in form of a light aluminum pass or bead to which the aluminum plate and filler material, if desired, may then be joined. Generally, in the joining of the thicker dissimilar metal plates of say about 1/2 inch and greater the normal increase in current and heat requirements necessitate more careful control of the operation to avoid burning off or damage of the flux coating. By first joining the light aluminum pass or bead to the coating the requirements of stricter control during the operation are alleviated and it is preferred, therefore to fabricate assemblies involving the thicker dissimilar metal plates in accordance with this embodiment of the invention. In carrying out this embodiment the dissimilar metal is cleaned to a bright surface to remove oxides and foreign matter and the smooth shiny flux coating formed on the brightened surface in the usual manner.

The light pass or bead of aluminum metal is then run on the flux coating from a consumable aluminum rod by melting the rod and coating under a shield of argon gas with an arc from a tungsten electrode. The molten aluminum is run on the molten coating while again controlling the disposition of the tungsten arc and heat generated therefrom to avoid damage of the flux coating. During the run the electric arc is therefore desirably directed to fall mostly on the aluminum rod and only on the flux coating as required to maintain it in the molten state. The amount of heat generated for the particular operation is again controled by selection of the proper electrode size and current setting based primarily on the thickness of the dissimilar metal. Preferred electrode sizes and current settings for the joining of dissimilar metals of ½ inch thickness and greater, in accordance with this embodiment of the invention, will be apparent from the representative values given below in Table I. The aluminum laid down on the flux coating need be only a small amount and varies generally with the thickness of the aluminum plate and dissimilar metal. Thickness of the aluminum bead is primarily a function of the thickness of the dissimilar metal plate. For example dissimilar metal plates of about ½ inch thickness generally require an aluminum bead of about $\frac{1}{32}$ inch to $\frac{1}{16}$ inch in thickness. Dissimilar metal plates of about 1 inch in thickness preferably have a bead of about ⅛ inch to ¼ inch in thickness. Width of the aluminum bead depends primarily on the thickness of the aluminum plate to be joined. Preferably, width of the aluminum bead is made at least about 2 times the thickness of the aluminum plate and is desirably equivalent to about 3 times the thickness of the aluminum plate to permit the desired amount of aluminum fillet material to be added on both sides of the aluminum plate. In completing the assembly which may be then readily accomplished, aluminum fillet material is added to both sides of the joint using a consumable aluminum rod. Prior to the addition of the fillet material the aluminum plate may be tacked to the aluminum bead or pass, if desired. During the addition of fillet material the arc from the tungsten electrode is desirably directed to melt the aluminum plate and aluminum bead in the joining area along with the filler rod and the molten aluminum metals flowed together to form the joint, as in conventional aluminum tungsten electrode, current settings, and rate of flow of argon shielding gas may be conveniently the same as in the disposition of the aluminum bead.

Control of the heat generated in the joining area by the tungsten electrode arc is an important factor in avoiding burning off or other damage of the flux coating. For the particular operation involved, the desired heat level is mostly a matter of selection of the proper electrode size and current setting which are determined primarily by the thickness of the dissimilar metal. The preferred rod sizes and current settings are those which require the least control to avoid damage of the flux coating. Rod sizes and current settings preferred in practice of the invention are given below in Table I for several representative dissimilar metal thicknesses.

TABLE I

| Tungsten Electrode Diameter in inches | Thickness of Dissimilar Metal, in inches | Current setting in amperes—for SUREWELD A.-C. WELDER, Model No. GA 300 |
|---|---|---|
| $\frac{3}{32}$ | ⅛–¼ | 110–120 |
| ⅛ | ¼–⅜ | 120–150 |
| ⅛ | ⅜–½ | 150–180 |
| ⅛ | ½–¾ | 190–250 |
| ⅛ | ¾–1½ | 250–300 |

The present invention involving the joining of aluminum to dissimilar metal may be practiced in several forms and embodiments adapted to the fabrication of the same wide variety of assemblies possible in the joining of aluminum to aluminum by tungsten inert gas shielded welding. Such welding tapes include butt welding, closed T, closed double V, single lap, closed single V butt. Plate and other common forms may be assembled including piping which may be joined together or to appurtenances. For example, aluminum pipe may be joined to dissimilar metal pipe or equipment by butt joining in a manner similar to plate as described, or through a sleeve or collar in situations where a particularly strong assembly capable of withstanding high pressures is desired. In a preferred embodiment of the invention which will be described, high strength is obtained by the sleeve-joining of aluminum pipe to dissimilar metal pipe or to an opening in dissimilar metal equipment. In this embodiment the sleeve is preferably constructed of the dissimilar metal and has an inside diameter adapted to receive the aluminum pipe in sleeve-fitting relation. The dissimilar metal sleeve is first fitted to about half its length over the dissimilar metal pipe or to the outlet in the dissimilar metal wall of equipment, as the case may be, and the dissimilar metals welded together with a similar metal rod by conventional methods. The inside and end surface of the other half of the dissimilar metal sleeve are cleaned to remove oxides and foreign matter, preferably first grinding and then washing the surface with hydrochloric acid. The flux composition of paste consistency is then coated by brushing on the inside and end surface of the brightened portion of the dissimilar metal sleeve and melted with an oxyacetylene flame which is preferably applied at an uncoated side of the dissimilar metal sleeve. The molten flux is then rubbed with a wool cloth to remove excess flux and form a smooth shiny metal coating. A light pass of aluminum metal is then run around the outside end portion and back onto the inside surface of the dissimilar metal sleeve using a consumable aluminum rod heated in the arc from a tungsten electrode. During the disposition the aluminum metal and flux coating are melted and the aluminum metal is deposited on the molten flux coating under a protective shield of inert gas. The electric arc from the tungsten rod is carefully controlled to fall mostly on the consumable aluminum rod in contact with the coated sleeve and is usually maintained a distance in the range of about ⅛ inch to $\frac{3}{16}$ inch from the flux coating to avoid buring off of the coating. Selection of the proper current setting and electrode size is based on the thickness of the dissimilar metal sleeve, which values are similar to those for equivalent dissimilar metal plate thicknesses given in Table 1. Generally, the aluminum pass covers only a portion of the exposed or available flux coating and, for example, represents a band of material having a width of about ¼ inch to ¾ inch for 2 inch pipe. The aluminum pipe to be joined is then inserted into the dissimilar metal sleeve coated with the light aluminum pass in the foregoing manner, preferably until the pipe abuts the end of the dissimilar metal pipe or a distance about halfway through the sleeve. Before insertion into the sleeve the end and outside surfaces of the aluminum pipe are cleaned by grinding to remove oxides. The assembly may then be completed by addition of aluminum fillet material from a consumable aluminum rod using the arc from a tungsten electrode to melt the aluminum pass and surface of the aluminum pipe in the joining area along with the aluminum rod from which molten aluminum metal is added to the joining area. During the disposition of the fillet material some of the molten metal may flow between the inside of the sleeve and outside of the aluminum pipe and contribute to the strength of the assembly.

Dissimilar metals which may be readily joined to aluminum by the method and composition of the present invention include iron, nickel, copper and zinc. The dissimilar metals may also be in the form of an alloy including those such as steel, everdur, stainless or chrome steel, brass, and Monel. The aluminum joined to the dissimilar metal may also be in the form of an alloy, for example, the silicon-aluminum alloys containing minor amounts of silicon, e.g. about 12 percent silicon, and the magnesium-aluminum alloys containing minor amounts of magnesium, e.g. about 1–2 percent magnesium. While it is not certain as to the reason, it has been found that the present invention by the procedure described above is apparently not suitable for the joining of aluminum to dissimilar metals such as titanium, silicon, tungsten, vanadium, zirconium, hafnium, and cadmium.

The following examples illustrate the practice and advantages of the present invention.

Example 1

In this example a ⅛" x 4" x 8" aluminum plate was joined to a ¼" x 4" x 8" steel plate to form a T-shaped assembly with the steel plate forming the horizontal cross member. The steel plate was prepared for joining by first grinding with a disc grinder wheel to expose a bright steel surface area which extended lengthwise across the central portion of the plate and had an average width of about 2 inches. This surface was then washed with dilute hydrochloric acid to ensure removal of all oxide and foreign matter. The center portion of the cleaned bright steel surface was then painted lengthwise with about a ¾ inch wide paste-like coating of an aqueous flux containing about 64.0 grams stannous chloride hydrate ($SnCl_2 \cdot 2H_2O$), about 39.3 grams zinc chloride, and about 88.5 grams finely divided lead. The flux composition was prepared by shaking the 191.8 total grams of the flux components in a capped glass receptacle of about 15.3 cubic inch capacity for about 2 minutes to thoroughly mix the components. About 65 total grams of water was then gradually added with mild agitation to form a composition of paste-like consistency. The total weight of the flux coated on the steel plate was about 5 grams with the average thickness of the coating being about .006 inch. Before applying the flux the steel plate was heated on the side opposite the brightened surface for about 2 minutes to a temperatures of about 400 to 600° F. with an oxyacetylene flame. After applying the flux composition the heating was continued with the oxyacetylene flame for about 5 minutes until all the flux had been melted. The molten flux, which had a dark pasty appearance, was then vigorously rubber for about 2 or 3 minutes during which excess flux was removed and a shiny metal deposit or coating was formed on the surface of the steel plate. The shiny flux coating covered the entire 8 inch length of the central portion of the brightened steel surface and averaged about 1 inch in width and about .004 inch in thickness. The steel plate was grounded and a copper striker plate attached to the width end of the steel plate. An electric arc was then struck on the copper plate from a 3/32 inch tungsten welding rod. A light pass or bead of aluminum was joined to the flux coating by melting of a ⅛ inch consumable aluminum rod in the electric arc which was led from the striker plate and run slowly lengthwise over the central portion of the steel plate. Total deposition time was about 2 minutes. During the aluminum deposition the electric arc was carefully directed to contact the aluminum plate about 3/16 inch above the flux coating so as to not puncture or burn off the flux coating but yet provide sufficient heat to melt the coating. The general area which included the melting aluminum rod and molten aluminum deposit therefrom on the molten flux coating was shielded from the atmosphere during the deposition by a blanket of argon gas directed from a standard No. 6 ceramic cup secured near the end of the tungsten rod. The argon gas flow rate was 15 cubic feet per hour. Current was supplied to the tungsten rod from a Sureweld A.-C. Welding Machine, Model No. GA300 at a current setting of about 110–120 amperes. The aluminum bead was joined across approximately the entire 1 inch width of the coating and had an average height from the flux coating of about 1/16 inch. The aluminum plate to be joined was prepared by grinding with a wire brush wheel to remove aluminum oxide and other impurities from the lengthwise joining edge. The surfaces adjacent the joining edge were also ground clean approximately 1 inch above the joining edge and in such a manner that these surfaces approximately ¼ inch from the edge were tapered to the edge which had a final thickness of about 1/16 inch. The joining edge of the aluminum plate was then placed on the aluminum bead and held manually in a position perpendicular to the steel plate. Using the same tungsten rod, current setting, and argon gas rate a small amount of aluminum was melted from a ⅛ inch consumable aluminum rod and deposited at three separate points along the line of contact of the aluminum plate and bead to tack the same together. During the tacking the electric arc was directed to aluminum plate about ⅛ inch above the joining edge. Again using the same tungsten rod, current setting, and argon gas rate the T-assembly was completed by the addition of aluminum fillet material from a ⅛ consumable aluminum rod. The fillet material was run the full length of both sides of the joint with the electric arc directed to the aluminum plate from the starter plate and thereafter run about ⅛ inch above the joining edge to flow molten aluminum from the aluminum plate and rod together with the molten aluminum of the bead to complete the assembly. The total amount of fillet material deposited was about 3/16 cubic inch.

The cooled assembly was tested for joint strength. The lengthwise edges of the steel plate were held firmly in a vice with the leg of the T-assembly extending upwardly and the top surface of the steel cross member more or less flush with the top of the vice jaws. The upwardly extending aluminum member was then hammered down without breaking over about a full 90 degrees until the aluminum plate was parallel with the steel plate. The aluminum plate was then bent by hammering throughout approximately 180 degrees in the return direction. As the aluminum became more or less parallel with the steel plate, rupture of the assembly occurred. Examination of the break showed that failure had occurred in the aluminum plate about 3/16 inch above the top of the aluminum bead and outside the joining area and that the joint between the aluminum and dissimilar metal remained unaffected.

Example 2

In this example a ⅛" x 2" x 5" aluminum plate was joined to a ⅛" x 2" x 5" copper plate to form a T-shaped assembly with the copper plate forming the horizontal cross member. The copper plate was prepared for joining by first grinding with a disc wire wheel to expose a bright copper surface area which extended lengthwise across the central portion of the plate and had an average width of about 1 inch. This surface was then washed with dilute hydrochloric acid to ensure removal of all oxide and foreign matter. The center portion of the cleaned bright copper surface was then painted lengthwise with about a ¾ inch wide coating of the same flux composition employed in Example 1. The total weight of the flux coated on the copper plate was about 5 grams with the average thickness of the coating being about .006 inch. Before applying the flux the copper plate was heated on the side opposite the brightened surface for about 2 minutes to a temperature of about 400–600° F. with an oxyacetylene flame. After applying the flux composition the heating was continued with the oxyacetylene flame for about 5 minutes until all the flux had been melted. The molten flux, which had a dark pasty appearance, was the vigorously rubbed for about 2–3 minutes during which excess flux was removed and a shiny metal deposit or coating was formed on the surface of the copper plate. The shiny flux coating covered the entire 5 inch length of the central portion of the brightened copper surface and averaged about ¾ inch in width and about .004 inch in thickness. The copper plate was grounded and a striker plate attached to the width end of the copper plate. An electric arc was then struck on the striker plate from a 3/32 inch tungsten welding rod. A light pass or bead of aluminum was joined to the flux coating by melting of a ⅛ inch consumable aluminum rod in the electric arc which was led from the striker plate and run slowly lengthwise over the central portion of the copper plate. Total disposition time was about 2 minutes. During the aluminum disposition the electric arc was carefully directed to contact the copper plate outside the general area of the flux coating (about ⅛ inch therefrom) so as to not puncture or burn off the flux coating but yet provide sufficient heat to melt the coating. The general area which included the melting aluminum rod and molten aluminum deposit therefrom on the molten flux coating was shielded from the atmosphere during the disposition by a blanket of argon gas directed from a standard No. 6 ceramic cup secured near the end of the tungsten rod. The argon gas flow rate was 15 cubic feet per hour. Current was supplied to the tungsten rod from a Sureweld A.-C. Welding Machine, Model No. GA300 at a current setting of about 110–120 amperes. The aluminum bead was joined across approximately the entire ¾ inch width of the coating and had an average height from the flux coating of about 3/16 inch. The aluminum plate to be joined was prepared by grinding with a wire brush wheel to remove aluminum oxide and other impurities from the lengthwise joining edge. The surfaces adjacent the joining edge were also ground clean approximately 1 inch above the joining edge and in such a manner that these surfaces approximately 3/16 inch from the edge were tapered to the edge which had a final thickness of about 1/16 inch. The joining edge of the aluminum plate was then placed on the aluminum bead and held manually in a position perpendicular to the copper plate. Using the same tungsten rod, current setting, and argon gas rate a small amount of aluminum was melted from a ⅛ inch consumable aluminum rod and deposited at three separate points along the line of contact of the aluminum plate and bead to tack the same together. During the tacking the electric arc was directed to aluminum plate about ⅛ inch above the joining edge. Again using the same tungsten rod, current setting, and argon gas rate the T-assembly was completed by the addition of aluminum fillet material from a ⅛ inch consumable aluminum rod. The fillet material was run the full length of both sides of the joint with the electric arc directed to the aluminum plate from the starter plate and thereafter run about ⅛ inch above the joining edge to flow molten aluminum from the aluminum plate and rod together with the molten aluminum of the bead. Molten aluminum fillet material was also joined to the previously uncovered portion of the flux coating at the margins of the aluminum bead. The addition of fillet material was also carefully carried out to avoid porosity and crater indentations. The total amount of fillet material deposited was about 3/16 cubic inch.

The cooled assembly was tested for joint strength. The lengthwise edges of the copper plate were held firmly in a vice with the leg of the T-assembly extending upwardly and the top surface of the copper cross member more or less flush with the top of the vice jaws. The upwardly extending aluminum member was then hammered down without breaking over about a full 90 degrees until the aluminum plate was parallel with the copper plate. The aluminum plate was then bent by hammering throughout 180 degrees in the return direction until it became more or less parallel with the copper plate. Examination of the joint showed no signs of failure.

*Example 3*

In this example a ¼″ x 4″ x 6″ aluminum plate was joined to a ¼″ x 4″ x 6″ steel plate to form a T-shaped assembly with the steel plate forming the horizontal cross member. The steel plate was prepared for joining by first grinding with a disc wire wheel to expose a bright steel surface area which extended lengthwise across the central portion of the plate and had an average width of about 1 inch. This surface was then washed with dilute hydrochloric acid to ensure removal of all oxide and foreign matter. The center portion of the cleaned bright steel surface was then painted lengthwise with about a ¾ inch wide coating of the same flux composition employed in Example 1. The total weight of the flux coated on the steel plate was about 5 grams with the average thickness of the coating being about .006 inch. Before applying the flux the steel plate was heated on the side opposite the brightened surface for about 2 minutes to a temperature of about 400–600° F. with an oxyacetylene flame. After applying the flux composition the heating was continued with the oxyacetylene flame for about 5 minutes until all the flux had been melted. The molten flux, which had a dark pasty appearance, was then vigorously rubbed for about 2 to 3 minutes during which excess flux was removed and a shiny metal deposit or coating was formed on the surface of the steel plate. The shiny flux coating covered the entire 6 inch length of the central portion of the brightened steel surface and averaged about ¾ inch in width and about .004 inch in thickness. The aluminum plate to be joined was prepared by grinding with a wire brush wheel to remove aluminum oxide and other impurities from the lengthwise joining edge. The surfaces adjacent the joining edge were also ground clean approximately 1 inch above the joining edge and in such a manner that these surfaces approximately ¼ inch from the edge were tapered to the edge which had a final thickness of about 1/16 inch. The joining edge of the aluminum member was then placed along the flux coating and held manually in a position perpendicular to the steel plate. The steel plate was grounded and a copper striker or starter plate attached to the width end of the steel plate. An electric arc was then struck on the copper plate from a ⅛ inch tungsten welding rod. The electric arc was then moved onto the aluminum plate and a small amount of aluminum was melted from a ¼ inch consumable aluminum rod and deposited at 3 separate points along the line of contact of the aluminum plate and flux coating. During the tacking the electric arc was carefully directed to the aluminum plate about ⅛ inch above the joining edge so as not to puncture or burn off the flux coating while still providing sufficient heat to melt the flux coating, aluminum rod, and aluminum plate at the point of tacking and flow the same together. The general area including the melting aluminum rod and aluminum plate and coating at the point of tacking was shielded from the atmosphere during the tacking by a blanket of argon gas directed from a standard No. 8 ceramic cup secured to the end of the tungsten rod. The argon gas flow rate was 20 cubic feet per hour. Current was supplied to the tungsten rod at a setting of about 190–200 amperes from a Sureweld A.-C. Welding Machine, Model No. GA300. Using the same tungsten rod, current setting, and argon gas rate the T-assembly was completed by the addition of aluminum fillet material from a ¼ inch consumable aluminum rod. The fillet material was run the full length of both sides of the joint with the electric arc directed to the aluminum plate from the starter plate and thereafter slowly run about ⅛ inch above the joining edge to flow molten aluminum from the aluminum plate and rod together with the molten flux coating. The addition of fillet material was also carefully carried out to avoid penetrating or burning off of the flux coating. The total time for deposition of the fillet material was about 2 minutes and the total amount of fillet material deposited was about 3/16 cubic inch.

The cooled assembly was tested for joint strength. The lengthwise edges of the steel plate were held firmly in a vice with the leg of the T-assembly extending upwardly and the top surface of the steel cross member more or less flush with the top of the vice jaws. The upwardly extending aluminum member was then hammered down without breaking over about a full 90 degrees until the aluminum plate was parallel with the steel plate. The aluminum plate was then bent by hammering throughout 180 degrees in the return direction until it became more or less parallel with the steel plate. Examination of the joint showed no signs of failure.

In the following examples a ¼" x 4" x 6" aluminum plate was joined to a ¼" x 4" x 6" dissimilar metal plate to form a T-shaped assembly in which the dissimilar metal plate was the horizontal cross member. Procedure employed was similar to Example 3 except that the T-shaped assembly was evaluated by a special tensile strength test in which it was attempted to pull the assembly apart at the joint. In this test the aluminum leg of the T-shaped assembly was secured horizontally in a special vice and clamp assembly. Both sides of the horizontal cross-member of the T-shaped assembly were held in a C-shaped jig which had a U-shaped member welded thereto in longitudinal alignment with the leg of the T-shaped assembly. A vertical steel plate was welded to a common base plate of the test assembly and had a threaded nut welded thereto in alignment with an opening in the plate. An elongated bolt having 8 threads per inch was held at one end by a washer in an opening in the U-shaped member and extended through the nut and opening on vertical plate so that on turning of the bolt pulling forces were exerted on the joint. Results were evaluated in the number of quarter turns of the bolt required to break the assembly or aluminum member. A value of 12 or better was indicative of good strength. A value of 20 represented about the yield point of the aluminum member and was the maximum recorded as such value was illustrative of the formation of a joint having at least the strength of the aluminum. The assemblies prepared in the preceding Examples 1–3, inclusive, all have a value of 20 by the tensile strength test.

Example 4

Copper was joined to aluminum employing an aqueous paste composition containing 3.38 parts finely divided tin, 13.2 parts lead chloride and 2.0 parts finely divided zinc. The tensile strength test gave a value of 19.

Example 5

Steel was joined to aluminum employing the flux composition of Example 4. Tensile strength test value was 20.

Example 6

Stainless steel was joined to aluminum employing the flux composition of Example 4. Tensile strength test value was 20.

Example 7

Steel was joined to aluminum employing an aqueous paste composition containing 3.38 parts finely divided tin, 8.85 parts finely divided lead, and 3.9 parts zinc chloride. Tensile strength test gave a value of 15.

Example 8

Stainless steel was joined to aluminum employing the flux composition of Example 4. The tensile strength test value was 15.

Example 9

Copper was joined to aluminum employing an aqueous paste composition containing 5.37 parts stannous chloride dihydrate ($SnCl_2 \cdot 2H_2O$), 13.2 parts lead chloride and 2.0 parts finely divided zinc. The tensile strength test gave a value of 16.

Example 10

Steel was joined to aluminum employing the flux composition of Example 9. Tensile strength test value was 12.

Example 11

Copper was joined to aluminum employing an aqueous paste composition containing 7.95 parts stannous bromide, 8.85 parts finely divided lead and 3.9 parts zinc chloride. The tensile strength test gave a value of 20.

Example 12

Steel was joined to aluminum employing the flux composition of Example 11. Tensile strength test value was 20.

Example 13

Stainless steel was joined to aluminum employing the flux composition of Example 11. Tensile strength test value was 20.

Example 14

Copper was joined to aluminum employing an aqueous paste composition containnig 7.95 parts stannous bromide, 11.9 parts lead chloride and 2.0 parts finely divided zinc metal. The tensile strength test gave a value of 20.

Example 15

Steel was joined to aluminum employing the flux composition of Example 14. The tensile strength test value was 20.

Example 16

Steel was joined to aluminum employing an aqueous paste composition containing 5.4 parts stannous chloride dihydrate, 17.4 parts lead bromide and 2.0 parts finely divided zinc. Tensile strength test value was 15.

Example 17

Stainless steel was joined to aluminum employing the flux composition of Example 16. The tensile strength test gave a value of 18.

Example 18

Stainless steel was joined to aluminum employing an aqueous paste composition containing 4.5 parts stannous fluoride, 8.85 parts finely divided lead, and 3.9 parts zinc chloride. The tensile strength test gave a value of 18.

Example 19

Steel was joined to aluminum employing an aqueous paste composition containing 3.4 parts finely divided tin, 8.85 parts finely divided lead and 9.2 parts zinc iodide. The tensile strength test gave a value of 20.

Example 20

Stainless steel was joined to aluminum employing an aqueous paste composition containing 5.4 parts stannous chloride dihydrate, 8.85 parts finely divided lead and 9.2 parts zinc iodide. The tensile strength test value was 20.

Example 21

Steel was joined to aluminum employing an aqueous paste composition containing 5.9 parts tin oxalate, 8.85 parts finely divided lead and 3.9 parts zinc chloride. The tensile strength test value was 15.

Example 22

Steel was joined to aluminum employing an aqueous paste composition containing 3.8 parts stannous oxide, 8.85 parts finely divided lead and 3.9 parts zinc chloride. The tensile strength test value was 15.

Example 23

Steel was joined to aluminum employing an aqueous paste composition containing 6.2 parts stannous sulfate, 8.85 parts finely divided lead and 3.9 parts zinc chloride. The tensile strength test value was 16.

Example 24

Steel was joined to aluminum employing an aqueous paste composition containing 6.8 parts stannous acetate, 8.85 parts finely divided lead and 3.9 parts zinc chloride. The tensile strength test value was 20.

Example 25

Steel was joined to aluminum employing an aqueous paste composition containing 5.4 parts stannous chloride dihydrate, 13.0 parts basic lead acetate and 2.0 parts finely divided zinc. The tensile strength test value was 16.

Example 26

Steel was joined to aluminum employing an aqueous paste composition containing 3.4 parts finely divided tin, 13.2 parts lead chloride and 6.3 parts zinc acetate dihydrate. The tensile strength test value was 20.

Although certain preferred embodiments of the invention have been disclosed for purpose of illustration, it will be evident that various changes and modifications may be made therein without departing from the scope and spirit of the invention.

I claim:

1. The method of joining aluminum to dissimilar metal which comprises: (A) forming a molten flux composition on a bright surface of a dissimilar metal selected from the group consisting of iron, nickel, copper, chromium, zinc, and mixtures thereof, said flux composition consisting essentially of in the following proportions based on the weight of the base metals:
    (a) .35 to 1.55 parts tin,
    (b) .15 to .75 part zinc,
    (c) 1.25 to 5.5 parts lead;
provided at least one member from the group of (a), (b) and (c), above, is in the form of a salt of the metal and at least one other member in the metallic form; (B) forming a thin metal deposit from said flux on the surface of the dissimilar metal, (C) disposing aluminum metal free of oxides adjacent the flux coating, (D) applying an electric arc from an electrode to melt the aluminum metal and flux coating while controlling the electric arc and heat generated thereby to avoid burning off of the flux coating, (E) shielding said aluminum metal and flux coating while in the molten state from the atmosphere with a blanket of an inert gas and (F) flowing said molten aluminum metal to the molten flux coating while continuing said inert gas shielding and arc control to join said aluminum metal to said dissimilar metal.

2. The method of joining aluminum to dissimilar metal which comprises: (A) forming a molten flux composition on a bright surface of a dissimilar metal selected from the group consisting of iron, nickel, copper, chromium, zinc, and mixtures thereof, said flux composition consisting essentially of in the following proportions based on the weight of the base metals:
    (a) .35 to 1.55 parts tin supplied as a member selected from the group consisting of finely divided tin metal, tin chloride, and tin bromide, and mixtures thereof,
    (b) .15 to .75 part zinc supplied as a member selected from the group consisting of finely divided zinc metal, zinc chloride and zinc bromide, and mixtures thereof,
    (c) 1.25 to 5.5 parts lead supplied as a member selected from the group consisting of finely divided lead metal, lead chloride and lead bromide, and mixtures thereof;
provided at least one member from the group of (b) and (c), above, is in the metallic form and one member in the halide form; (B) forming a thin metal deposit from said flux on the surface of the dissimilar metal, (C) disposing aluminum metal free of oxide adjacent the flux coating, (D) applying an electric arc from an electrode to melt the aluminum metal and flux coating while controlling the electric arc and heat generated thereby to avoid burning off of the flux coating, (E) shielding said aluminum metal and flux coating while in the molten state from the atmosphere with a blanket of an inert gas and (F) flowing said molten aluminum metal to the molten flux coating while continuing said inert gas shielding and arc control to join said aluminum metal to said dissimilar metal.

3. The method of claim 2 in which the flux composition consists essentially of:
    Stannous chloride, 1⅛ to 2⅜ parts,
    Zinc chloride, ⅝ to 1⅜ parts,
    Lead—powder, 1½ to 4 parts.

4. The method of joining aluminum to dissimilar metal which comprises: (A) disposing a flux composition on a bright surface of a dissimilar metal selected from the group consisting of iron, nickel, copper, chromium, zinc and mixtures thereof, said flux compositions covering an area on the bright surface at least equivalent to about twice the area of the joining surface of the aluminum member to be joined and consisting essentially of in the following proportions by weight:
    (a) .35 to 1.55 parts tin supplied as a member selected from the group consisting of finely divided tin metal, tin chloride, and tin bromide, and mixtures thereof,
    (b) .15 to .75 part zinc supplied as a member selected from the group consisting of finely divided zinc metal, zinc chloride and zinc bromide, and mixtures thereof,
    (c) 1.25 to 5.5 parts lead supplied as a member selected from the group consisting of finely divided lead metal, lead chloride and lead bromide, and mixtures thereof;
provided at least one member from the group of (b) and (c), above, is in the metallic form and one member in the halide form; (B) heating said flux to a molten condition, (C) rubbing the molten flux to form a thin shiny metal coating on the surface of the dissimilar metal, (D) disposing an aluminum member free of oxide in contact with the shiny metal flux coating and in desired assembled relation with the dissimilar metal to form a joining area in which said aluminum member and dissimilar metal are to be joined, (E) providing a source of aluminum fillet material, (F) applying an electric arc from a tungsten electrode to melt the aluminum member, aluminum fillet material and flux coating while controlling the electric arc and heat generated thereby to avoid burning off of the flux coating, (G) shielding the aluminum and coating while in the molten state from the atmosphere with a blanket of inert gas containing argon and (H) flowing molten aluminum metal together in the joining area and to the molten flux coating while continuing said inert gas shield and arc control to join said aluminum member to said dissimilar metal.

5. The method of claim 4 in which the flux composition is applied to the dissimilar metal surface in aqueous paste form and consists essentially of:
    Stannous chloride, 1⅛ to 2⅜ parts,
    Zinc chloride, ⅝ to 1⅜ parts,
    Lead—power, 1½ to 4 parts.

6. The method of joining aluminum to dissimilar metal which comprises: (A) forming a molten flux composition on a bright surface of a dissimilar metal selected from the group consisting of iron, nickel, copper, chromium, zinc and mixtures thereof, said flux composition covering an area on the bright surface at least equivalent to about twice the area of the joining surface of the aluminum member to be joined and consisting essentially of in the following proportions by weight:
    (a) .35 to 1.55 parts tin supplied as a member selected from the group consisting of finely divided tin metal, tin chloride, and tin bromide, and mixtures thereof,
    (b) .15 to .75 part zinc supplied as a member selected from the group consisting of finely divided zinc metal, zinc chloride and zinc bromide, and mixtures thereof,
    (c) 1.25 to 5.5 parts lead supplied as a member selected from the group consisting of finely divided lead metal, lead chloride and lead bromide, and mixtures thereof;

provided at least one member from the group of (b) and (c), above, is in the metallic form and one member in the halide form; (B) rubbing the molten flux to form a thin metal coating on the surface of the dissimilar metal, (C) establishing a source of aluminum metal free of oxide adjacent the flux coating, (D) applying an electric arc from a tungsten electrode to melt the aluminum metal flux coating while controlling the electric arc and heat generated thereby to avoid burning off of the flux coating, (E) shielding said aluminum metal and flux coating while in the molten state from the atmosphere with a blanket of inert gas containing argon, (F) running a light pass of aluminum metal from said molten source of aluminum metal onto said molten flux coating while continuing said inert gas shielding and arc control, (G) disposing the aluminum member to be joined in contact with the light pass of aluminum metal and in desired assembled relation with the dissimilar metal, (H) providing a source of aluminum metal adjacent the light pass of aluminum metal, (I) applying an electric arc from a tungsten electrode to melt the aluminum member, the light pass of aluminum metal and the source of aluminum metal, (J) shielding the molten aluminum metals from the atmosphere with a blanket of inert gas containing argon and (K) flowing the molten aluminum metals together while continuing said inert gas shielding to join said aluminum member to the dissimilar metal.

7. The method of claim 6 in which the flux composition is applied to the dissimilar metal surface in aqueous paste form and consists essentially of:
Stannous chloride, 1⅛ to 2⅜ parts,
Zinc chloride, ⅝ to 1⅜ parts,
Lead—powder, 1½ to 4 parts.

8. The method of joining aluminum to dissimilar metal selected from the group consisting of iron, nickel, copper, chromium, zinc, and mixtures thereof, comprising (A) forming on a bright surface of the dissimilar metal a thin metal coating of an alloy of ½ to 6% by weight zinc, 25-75% by weight tin, and 25-75% by weight lead, (B) disposing aluminum metal free of oxides adjacent the metal coating, (C) applying an electric arc from an electrode to melt the aluminum metal and coating while controlling the electric arc and heat generated thereby to avoid burning off of the coating, (D) shielding said aluminum metal and coating while in the molten state from the atmosphere with a blanket of an inert gas and (E) flowing said molten aluminum metal to the molten coating while continuing said inert gas shielding and arc control to join said aluminum metal to said dissimilar metal.

9. The method of claim 8 in which said metal alloy coating contains tin and lead each in an amount between about 40-60% by weight.

10. A flux composition for joining aluminum to dissimilar metal which consists essentially of in the following proportions based on the weight of the base metals:
(a) .7 to 1.5 parts tin supplied as a member selected from the group consisting of finely divided tin metal, stannous chloride, stannic choride, stannous bromide, stannic bromide, and mixtures thereof.
(b) .3 to .65 part zinc supplied as a member selected from the group consisting of finely divided zinc metal, zinc chloride and mixtures thereof.
(c) 1.1 to 3.0 parts lead supplied as a member selected from the group consisting of finely divided lead, lead chloride and mixtures thereof;
provided at least one member from the group of (b) and (c), above, is in the halide form and the other member in the metallic form.

11. The composition of claim 10 in which tin is supplied as stannous chloride, the zinc is supplied as zinc chloride, and the lead is in the metallic form.

12. A flux composition for joining aluminum to dissimilar metal which consists essentially of in the following proportions by weight:
Stannous chloride, 1⅛ to 2⅜ parts,
Zinc chloride, ⅝ to 1⅜ parts,
Lead in finely divided form, 1½ to 4 parts.

13. The composition of claim 12 in which water is incorporated to form a paste of said composition.

References Cited by the Examiner
UNITED STATES PATENTS

| | | | |
|---|---|---|---|
| 2,033,102 | 3/1936 | Berry | 148—24 |
| 2,101,816 | 7/1937 | McBride | 148—24 |
| 2,790,656 | 4/1957 | Cook | 29—492 |
| 2,978,370 | 4/1961 | Mulholland | 148—24 |

DAVID L. RECK, *Primary Examiner.*

H F. SAITO, *Assistant Examiner.*